Oct. 30, 1951  S. C. HETH  2,573,140
SAFETY CLUTCH
Filed Oct. 2, 1946  3 Sheets-Sheet 3
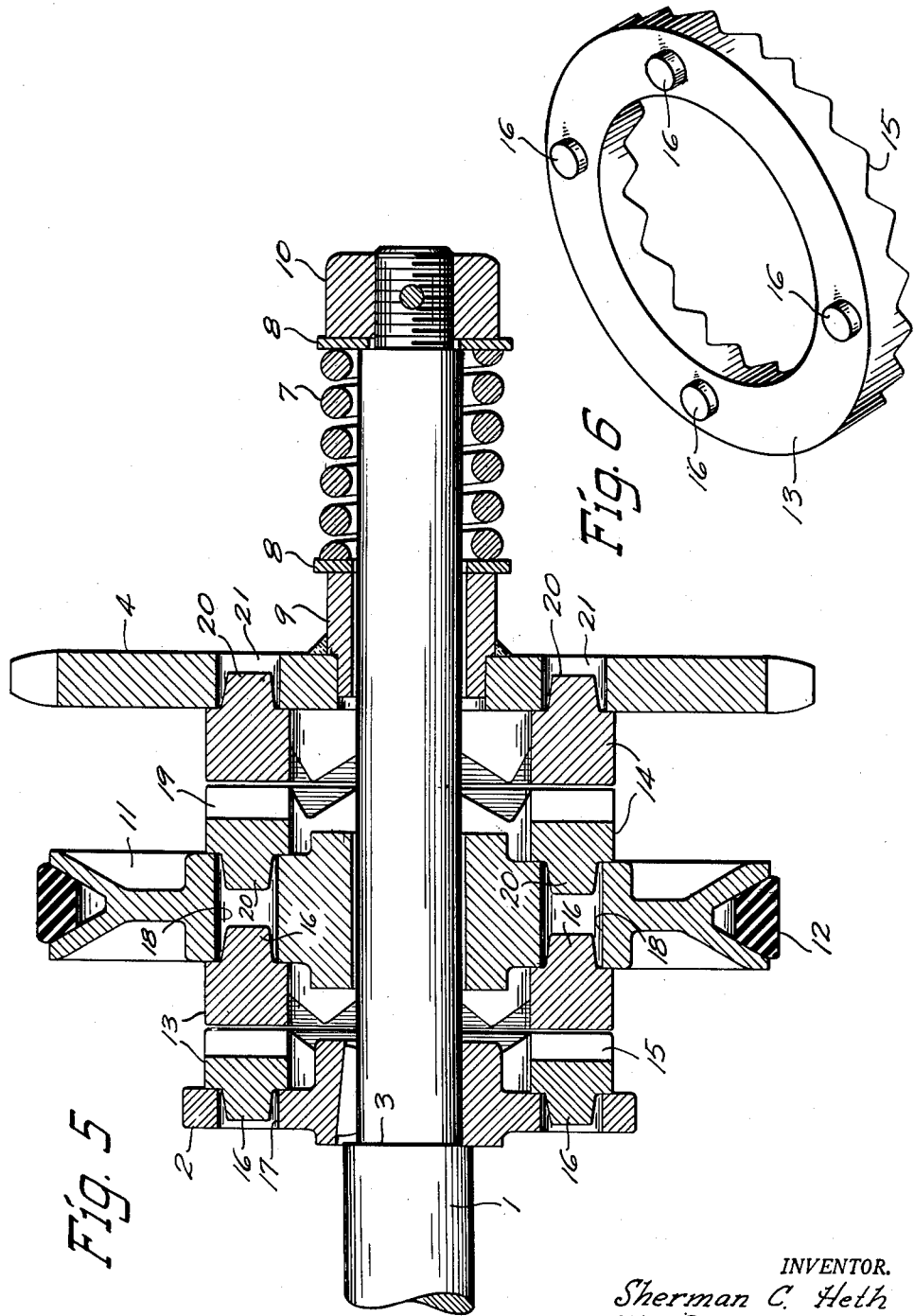
INVENTOR.
Sherman C. Heth
BY
Elwin A. Andrus
Attorney Patented Oct. 30, 1951

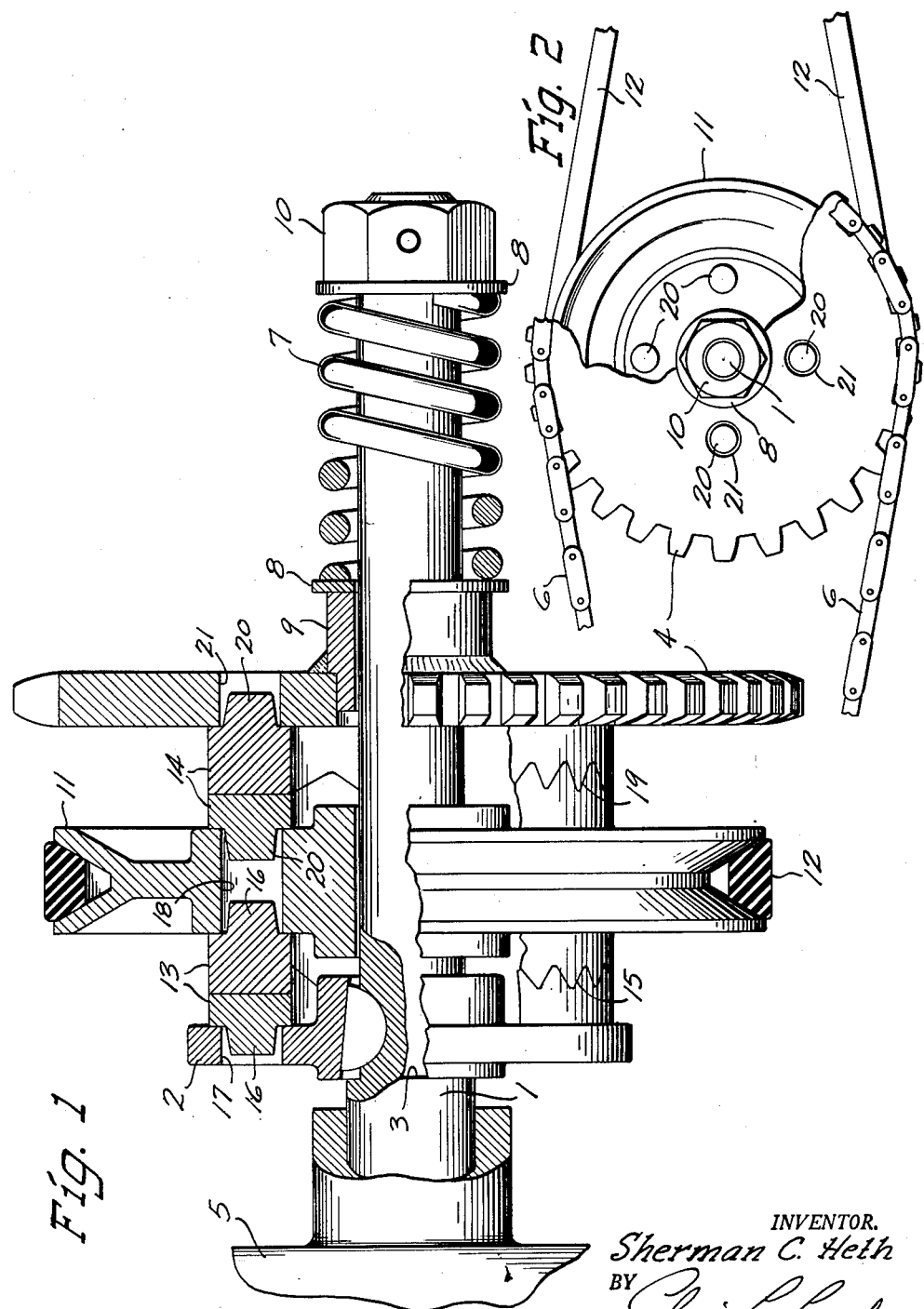

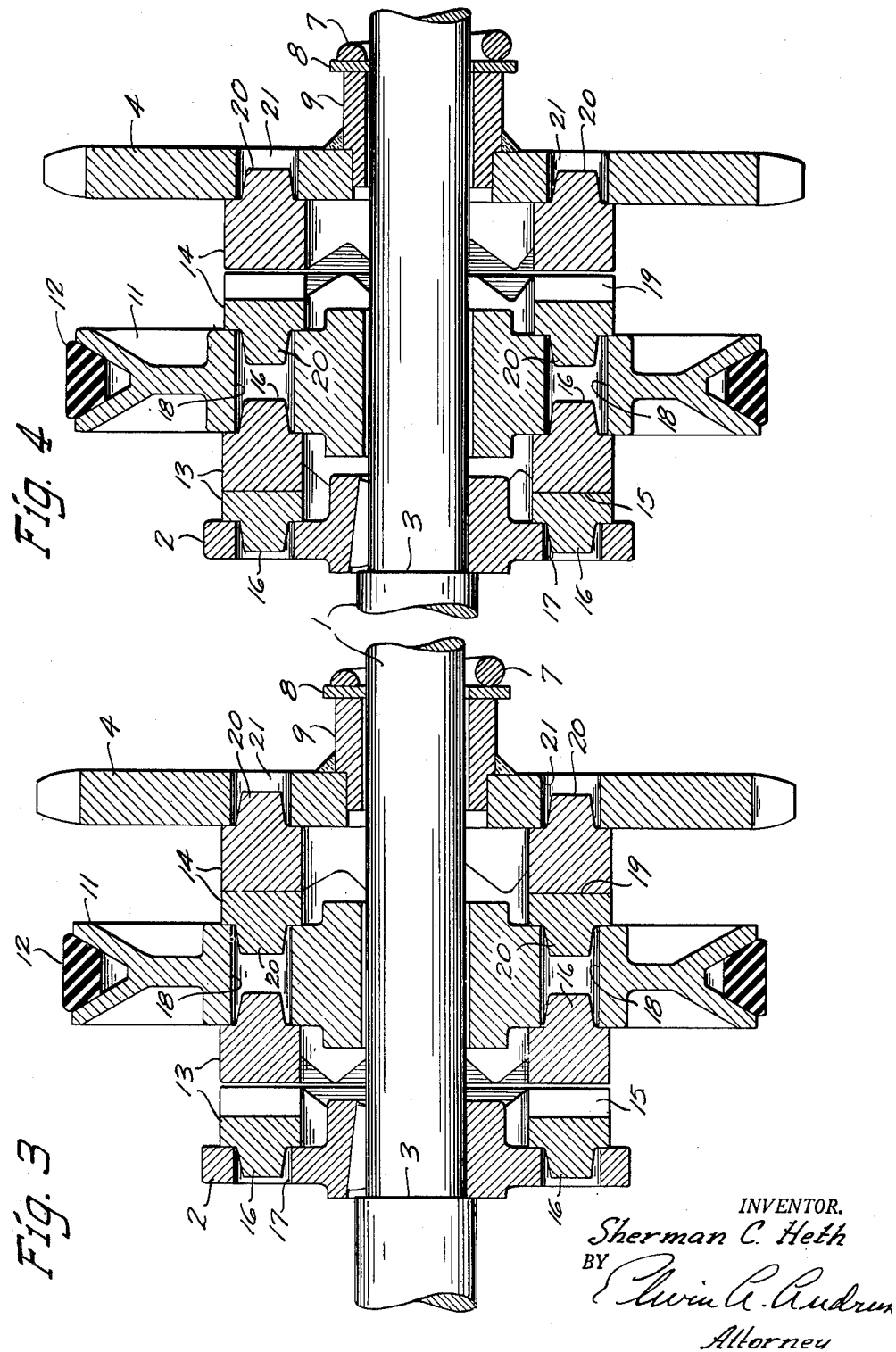

2,573,140

UNITED STATES PATENT OFFICE 2,573,140

SAFETY CLUTCH

Sherman C. Heth, Racine, Wis., assignor to J. I. Case Company, Racine, Wis., a company of Wisconsin Application October 2, 1946, Serial No. 700,790

4 Claims. (Cl. 64—29)

This invention relates to a safety or jump clutch and is particularly directed to a safety clutch which will protect two driven members either alternately or simultaneously from an overload.

In the operation of farm implements and the like it is necessary to provide means to disengage the implement from the power source by which it is operated in the event that the implement becomes obstructed in service and is subjected to overload. In some constructions it may be desirable to operate several separate parts of the implement from the power source which presents the problem of providing safety devices to disengage either or both of the driven parts from the power source in the event of obstruction or the like with resultant overload.

One object of the present invention is to provide a safety device comprising a single clutch mechanism to protect two driven members or parts of a farm implement or the like from overload.

Another object of the invention is to provide a simplified safety clutch mechanism of fewer parts than heretofore to protect at least two driven members from overload.

A further object of the invention is to provide a safety clutch for driven members in which lubrication of the parts is simplified.

Another object of the invention is to provide a safety clutch mechanism for a pair of driven members to protect the same from overload, and in which overload on one member and consequent slipping of the clutch mechanism therefor will not affect or interrupt operation of the other driven member.

These and other objects of the invention will appear hereinafter in connection with the following description of an embodiment of the invention as illustrated in the accompanying drawings.

In the drawings:

Figure 1 is a longitudinal sectional view of the clutch mechanism in driving engagement with the driven members and with parts in elevation;

Fig. 2 is a reduced end view of Figure 1;

Fig. 3 is a detail section corresponding to a part of Fig. 1 with the clutch disengaged from the shaft;

Fig. 4 is a similar detail section with the clutch disengaged from the sprocket;

Fig. 5 is a detail section with the clutch disengaged from both the shaft and sprocket; and Fig. 6 is a perspective view of one of the clutch rings.

The safety clutch mechanism of the invention is shown as assembled on the driven member or shaft 1 between the clutch plate 2 which is keyed to shaft 1 adjacent shoulder 3 thereon and the driven member or sprocket 4 which is mounted for free rotation and axial movement on shaft 1.

Shaft 1 extends into the housing 5 of a farm implement or the like to drive a part thereof, not shown. Sprocket 4 drives another part, not shown, of the farm implement through the chain 6.

Sprocket 4 is biased axially of shaft 1 toward the clutch mechanism to be described and the clutch plate 2 by means, such as the compression spring 7, which is confined on the shaft under a predetermined axial load between the washers 8. The inner washer 8 abuts against the boss-like hub 9 of sprocket 4 while the outer washer 8 is engaged and held in place by nut 10 which is threaded onto the free end of shaft 1.

The drive member of the unit comprises a pulley 11 which is assembled for free rotation and axial movement on shaft 1 between clutch plate 2 and sprocket 4. Driving movement is imparted to pulley 11 through a belt 12 or the like which is connected to the power source, not shown.

The clutch unit comprises a pair of ring members 13 which encircle shaft 1 between plate 2 and pulley 11, and a second pair of similar ring members 14 which encircle shaft 1 between pulley 11 and sprocket 4.

Each of the rings 13 has a plurality of complementary projections or teeth 15 on the inner face and the projections 15 of one ring 13 intermesh with the projections 15 of the other ring 13.

A plurality of circumferentially spaced lugs 16 are provided on the outer face of each ring 13. Lugs 16 on the inner ring 13 adjacent clutch plate 2 project into the complementary and circumferentially spaced recesses or apertures 17 of the clutch plate 2 to lock the inner ring and plate together for driving connection therebetween. Lugs 16 on the other ring 13 project into the complementary circumferentially spaced apertures 18 extending transversely through pulley 11 to lock the ring and pulley 11 together for driving connection therebetween.

As with rings 13, each of the rings 14 has a plurality of complementary projections or teeth 19 on its inner face and the projections 19 of one ring 14 intermesh with the projections 19 of the other ring 14.

A plurality of circumferentially spaced lugs 20 are provided on the outer face of each ring 14. Lugs 20 on the inner ring 14 adjacent drive pulley 11 interlock with the apertures 18 extending through pulley 11 while the lugs 20 of the outer ring 14 interlock with the circumferentially spaced recesses or apertures 21 which extend transversely through the sprocket 4.

In operation, when pulley 11 is driven and no excessive resistance is offered to the rotation of shaft 1 and sprocket 4, spring 7 under predetermined load will intermesh rings 13 with each other and rings 14 with each other, which will in turn drive shaft 1 and sprocket 4 through the respective lugs 16 and 20 and corresponding rings.

Should excessive resistance to rotation of shaft 1 occur, as by obstruction of the part of the implement being driven thereby, the clutch members 13 will separate by reason of the cam action of teeth 15 causing the outer member 13 to push pulley 11, clutch members 14 and sprocket 4 axially against spring 7, thereby additionally compressing the latter. Separation of rings 13 allows the ring 13 driven by pulley 11 to rotate free of the ring interlocked with clutch plate 2. However, as long as excessive resistance is not offered to rotation of sprocket 4, the latter will continue to be rotated by pulley 11 through the rings 14, as shown in Fig. 3.

In the event resistance is offered to the rotation of sprocket 4 due to the obstruction of the part being driven thereby, then spring 7 will additionally compress and rings 14 will separate and break the driving connection between pulley 11 and sprocket 4. As long as no excessive resistance is offered to shaft 1, however, shaft 1 will continue to be driven from pulley 11 through the intermeshed rings 13, as shown in Fig. 4.

If it should occur that excessive resistance to rotation of sprocket 4 and shaft 1 is offered simultaneously then spring 7 will compress sufficiently to break the intermeshing connection between both sets of rings 13 and 14. The pulley will then continue to rotate freely on shaft 1 and will only drive the ring 13 and the ring 14 interlocked therewith, the shaft 1 and sprocket 4 being stationary, as shown in Fig. 5.

In the situations described, where the obstructions to rotation of the sprocket or shaft are eliminated, spring 7 under predetermined axial load thereof will again intermesh the rings 13 or rings 14 or both, as the case may be, and driving movement will again be transmitted to the shaft or sprocket or both.

The invention provides a single safety clutch that is adapted to be employed with at least two driven members, thereby simplifying lubrication and construction.

The invention also provides a single safety clutch for two driven members whose operation as respects one of the driven members is separate and independent of the other driven member.

The clutch rings 13 and 14 may be formed integral with their adjacent holding members, thereby eliminating lugs 16 and 20 and the corresponding recesses 17, 18 and 21. Where such integral construction is employed, as by casting or forging the clutch faces directly with the corresponding clutch plate 2, sprocket 4 and wheel 11, the number of parts is substantially reduced.

Various embodiments of the invention may be employed within the scope of the accompanying claims.

I claim:

1. A safety clutch unit for transmitting rotary movement from a driving member to at least two driven members, comprising a rotary driving member disposed intermediate two separate axially aligned rotary members to be driven, a slip clutch face on each side of said intermediate driving member, a slip clutch face on each of said driven members disposed to inter-engage the corresponding adjacent clutch face on the driving member, one of said driven members being fixed against axial movement, and the driving member being movable axially in response to slippage of the interengaging clutch faces between said driving member and said axially fixed driven member, and the other driven member being movable axially in response to slippage of either set of interengaging clutch surfaces, and common means engaging said axially movable driven member and biasing said members together to effect normal engagement of the corresponding clutch faces thereof.

2. A safety clutch unit for transmitting rotary movement from a driving member to two driven members, comprising a pair of axially spaced aligned rotary driven members, a rotary driving member disposed between said driven members, a common axial support for said members, means securing one of said driven members against axial movement upon said support in a direction away from said driving member, said other driven member and said driving member being axially movable and rotatable upon said support, a pair of slip clutch faces carried by said intermediate driving member on opposite sides thereof and having teeth extending axially in opposite directions from said driving member toward the driven members, a slip clutch face on each driven member having complementary teeth disposed to engage and disengage the corresponding teeth of the adjacent slip clutch face of said driving member, and a single biasing means urging said axially movable driven member toward said axially secured driven member to normally hold all of said clutch faces in engagement and adapted to recede to provide for slippage of either clutch face engagement or of both such engagements under overload and emergency conditions.

3. A safety clutch unit for transmitting rotary movement from a driving member to two driven members, comprising a pair of axially spaced aligned rotary driven members, a rotary driving member disposed between said driven members, a common axial support for said members, means securing one of said driven members against axial movement upon said support in a direction away from said driving member, said other driven member and said driving member being axially movable upon said support, a pair of slip clutch faces carried by said intermediate driving member on opposite sides thereof and having teeth extending axially in opposite directions from said driving member toward the driven members, a slip clutch face on each driven member having complementary teeth disposed to engage and disengage the corresponding teeth of the adjacent slip clutch face of said driving member, an abutment on said support spaced from said axially movable driven member on the side thereof opposite said driving member and said axially secured driven member, and a compression spring carried by said support between said abutment and said axially movable driven member to bias the latter toward said axially secured driven member, said spring providing for axial movement of said axially movable driven member away from said driving member upon an overload of the clutch engagement between the adjacent clutch faces thereof and for axial movement of both said axially movable driven member and said driving member away from said axially secured driven member upon an overload of the clutch engagement between the adjacent clutch faces of said driving member and said axially secured driven member.

4. A safety clutch unit for transmitting rotary movement from a driving member to two driven members, comprising a rotary shaft to be driven, a driven clutch member secured axially and rotationally upon said shaft to drive the same, a driving clutch member mounted to rotate freely upon said shaft adjacent said driven clutch member, interlocking slip clutch faces carried by said driven and driving clutch members and adapted to force said members to separate upon overload and disengage upon separation of said members, a second driven clutch member mounted to rotate freely upon said shaft adjacent said driving clutch member and on the opposite side thereof from said first named driven clutch member, interlocking slip clutch faces carried by said driving clutch member and said second driven clutch member and adapted to force said members to separate upon overload and to disengage upon separation of said members, the interlocking clutch faces carried by said intermediate driving member facing axially in opposite directions therefrom and toward the corresponding slip clutch members, an abutment on said shaft spaced from said second driven member and on the side thereof opposite said driving member, and a compression coil spring encircling said shaft between said abutment and said second driven member to bias said last named member toward said first named driven member, said spring having a compression capacity providing for separation of all of said clutch faces upon overload of both driven members.

SHERMAN C. HETH.

REFERENCES CITED

The following references are of record in the file of this patent:

UNITED STATES PATENTS

| Number | Name | Date |
|---|---|---|
| 2,145,083 | Dynes | Jan. 24, 1939 |
| 2,375,020 | Mitchell | May 1, 1945 |